US008044134B2

(12) United States Patent
Chung et al.

(10) Patent No.: US 8,044,134 B2
(45) Date of Patent: Oct. 25, 2011

(54) POLYLACTIC ACID RESIN COMPOSITION

(75) Inventors: Young-Mi Chung, Uiwang-si (KR); Chang-Do Jung, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 244 days.

(21) Appl. No.: 12/478,888

(22) Filed: Jun. 5, 2009

(65) Prior Publication Data

US 2009/0306287 A1     Dec. 10, 2009

(51) Int. Cl.
C08L 67/04   (2006.01)
C08L 69/00   (2006.01)
C08L 31/02   (2006.01)
C08K 5/17    (2006.01)

(52) U.S. Cl. ........ 524/506; 524/502; 524/504; 524/513; 524/515; 524/537; 525/63; 525/67; 525/146; 525/148; 525/185; 525/190; 525/418; 525/419; 525/437; 525/439; 525/446; 525/450; 525/462; 525/464

(58) Field of Classification Search ............ 525/63, 525/67, 146, 148, 185, 190, 418, 419, 450, 525/462, 464, 437, 439, 446; 524/502, 504, 524/506, 513, 515, 537
See application file for complete search history.

(56) References Cited

U.S. PATENT DOCUMENTS

| 5,272,221 | A | 12/1993 | Kitao et al. | |
|---|---|---|---|---|
| 6,521,336 | B2 | 2/2003 | Narita et al. | |
| 7,465,770 | B2 | 12/2008 | Lewis et al. | |
| 2005/0059768 | A1 | 3/2005 | Dion et al. | |
| 2007/0049667 | A1 | 3/2007 | Kim et al. | |
| 2008/0042312 | A1* | 2/2008 | Chen et al. | 264/103 |
| 2008/0051508 | A1 | 2/2008 | Hayata et al. | |
| 2008/0262151 | A1 | 10/2008 | Ishii et al. | |

FOREIGN PATENT DOCUMENTS

| EP | 1193294 A2 | 4/2002 |
|---|---|---|
| EP | 1236753 A1 | 9/2002 |
| EP | 1792941 A1 | 6/2007 |
| JP | 1999-279380 | 10/1999 |
| JP | 2002-114899 A | 4/2002 |
| JP | 2002-371172 | 12/2002 |
| JP | 2003-138119 A | 5/2003 |
| JP | 2003-147180 A | 5/2003 |
| JP | 2006-070224 | 3/2006 |
| JP | 2006-143772 | 6/2006 |
| JP | 2006-321988 A | 11/2006 |
| JP | 2007-131795 | 5/2007 |
| JP | 2007-191538 | 8/2007 |
| JP | 2007-191622 | 8/2007 |
| KR | 10-0642289 B1 | 10/2006 |
| KR | 10-0758221 B1 | 9/2007 |
| KR | 10-2007-0104555 A | 10/2007 |

OTHER PUBLICATIONS

European Search Report in counterpart European Application No. 09162035, dated Oct. 14, 2009.

* cited by examiner

*Primary Examiner* — Ana Woodward
(74) *Attorney, Agent, or Firm* — Summa, Additon & Ashe, P.A.

(57) ABSTRACT

The present invention relates to a polylactic acid resin composition. The composition includes about 25 to about 80 parts by weight of a polylactic acid resin, (B) about 20 to about 75 parts by weight of a polycarbonate resin, and (C) about 0.01 to about 5 parts by weight of a chain extender including an amine group, based on about 100 parts by weight of (A)+(B). The polylactic acid resin composition of the present invention is environmentally-friendly and has excellent hydrolysis resistance and simultaneously improved mechanical strength and heat resistance, and accordingly can be used for manufacturing various molded products requiring heat resistance and mechanical strength, for example vehicles, machine parts, electronic parts, office machines, miscellaneous goods, and the like.

12 Claims, 2 Drawing Sheets

POLYLACTIC ACID RESIN COMPOSITION

CROSS-REFERENCE TO RELATED APPLICATION

This application claims priority to and the benefit of Korean Patent Application No. 10-2008-0053114, filed in the Korean Intellectual Property Office on Jun. 5, 2008, the entire disclosure of which is incorporated herein by reference.

FIELD OF THE INVENTION

The present invention relates to a polylactic acid resin composition.

BACKGROUND OF THE INVENTION

Recent research on polymer materials has focused on the development of a strong polymer material for special purposes, and on its safety. However, increased social awareness worldwide of the environmental problems associated with discarded polymer materials has led to efforts to develop an environmentally-friendly polymer material.

Environmentally-friendly polymers are typically classified as photodegradable and biodegradable polymers. In general, biodegradable polymer materials have a functional group at their main chain that can be decomposed by microorganisms. Among these materials, much research has focused on aliphatic polyester polymer because it has excellent manufacturing and easily-adjustable decomposition characteristics. In particular, polylactic acid (PLA) is widely used in food packing materials and containers, cases for electronics, and the like, replacing conventional plastics, with a worldwide market of 150,000 tons. Accordingly, polylactic acid resin has been primarily used in disposable products, for example food containers, wraps, films, and the like due to its biodegradable characteristics. Examples of commercially produced polylactic acid include polylactic acid polymers produced by American Natureworks LLC, Japanese Toyota Motor Corp., and the like.

However, since conventional polylactic acid resin lacks formability, mechanical strength, and heat-resistance, it may be easily destroyed when made into a thin film. In addition, since it has low temperature resistance, a molded product made thereof may be distorted at a temperature of 60° C. or higher.

In order to solve these problems, polylactic acid resin has been blended with conventional petroleum-based thermoplastic plastics, for example polycarbonate resin, polyamide resin, acrylonitrile-butadiene-styrene (ABS) resin, polyacetal resin, and the like.

Japanese Patent Laid-Open Publication No. 1999-279380 and No. 2006-070224 disclose a method of increasing heat-resistance of polylactic acid resin by using a polylactic acid-ABS resin composition, and Japanese Patent Laid-Open Publication No. 2006-143772 and U.S. Pat. No. 5,272,221 disclose a method of enhancing biomass by using a polylactic acid-polyamide resin composition. In addition, Japanese Patent Laid-Open Publication Nos. 2003-147180 and No. 2003-138119 disclose a method of increasing heat-resistance and the like by using a polyoxymethylene-polylactic acid resin composition.

However, when polycarbonate resin is included in a blend in an amount of 50 parts by weight or less, there is a problem in that polylactic acid forms a continuous phase and polycarbonate resin forms a dispersed phase due to the relatively low viscosity of the polylactic acid during the compounding process. When polylactic acid forms a continuous phase, the resin composition may not exhibit improved properties such as thermal stability, hydrolysis resistance, and the like. Accordingly, there is no significant advantage of blending a polycarbonate resin with polylactic acid resin.

Japanese Patent Laid-Open Publication No. 2006-321988 prescribes the viscosity of a polyolefin to form a continuous phase when it is blended with polylactic acid. However, it does not specifically disclose a method of improving the viscosity of polylactic acid.

SUMMARY OF THE INVENTION

One exemplary embodiment of the present invention provides an environmentally-friendly resin composition having remarkably improved heat-resistance, mechanical strength, and hydrolysis resistance. The composition includes a chain extender including an amine group that can react with a carboxyl group of a polylactic acid resin, so that it can increase the viscosity of the polylactic acid resin. As a result, the polylactic acid resin composition can undergo a phase transition so that the polylactic acid resin can form a dispersed phase instead of a continuous phase in a polymer blend under extrusion conditions.

Another embodiment of the present invention provides a polylactic acid resin composition suitable for molded products such as vehicles, auto parts, machine parts, electronic parts, office machines, or miscellaneous goods, which require heat-resistance and mechanical strength.

The embodiments of the present invention are not limited to the above technical purposes, and a person of ordinary skill in the art can understand other technical purposes.

According to one embodiment of the present invention, a polylactic acid resin composition is provided that includes (A) about 25 to about 80 parts by weight of a polylactic acid (PLA) resin, (B) about 20 to about 75 parts by weight of a polycarbonate resin, and (C) about 0.01 to about 5 parts by weight of a chain extender including an amine group, based on about 100 parts by weight of (A)+(B).

According to another embodiment of the present invention, provided is a molded product made from the polylactic acid resin composition.

Hereinafter, further embodiments of the present invention will be described in detail.

According to the embodiments of the present invention, the polylactic acid resin composition is environmentally-friendly and can blend well with a thermoplastic resin, and has improved heat-resistance, impact strength, and hydrolysis resistance. Accordingly, it can be used in the production of various molded products such as vehicles, auto parts, machine parts, electronic parts, office machines, miscellaneous goods, and the like, which require heat-resistance and mechanical strength.

DETAILED DESCRIPTION OF THE INVENTION

Figure 1:
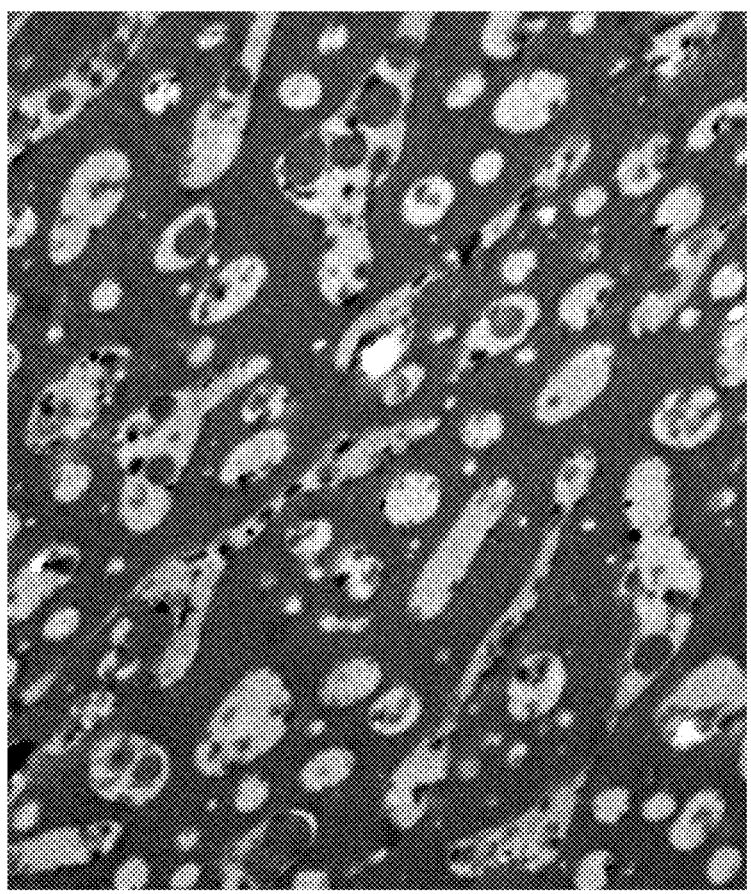
FIG. 1 shows a morphology photograph of a pellet according to Example 1 of the present invention, taken with a transmission electronic microscope.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, the terms "a" and "an" are open terms that may be used in conjunction with singular items or with plural items.

As used herein, the term "(meth)acrylate" refers to both acrylate and methacrylate; the term "(meth)acrylic acid" refers to both acrylic acid and methacrylic acid; and the term "(meth)acrylonitrile" refers to both acrylonitrile and methacrylonitrile.

The polylactic acid resin composition according to one embodiment of the present invention includes (A) about 25 to about 80 parts by weight of a polylactic acid (PLA) resin, and (B) about 20 to about 75 parts by weight of a polycarbonate resin, and (C) about 0.01 to about 5 parts by weight of a chain extender including an amine group, based on about 100 parts by weight of (A)+(B).

Exemplary components included in the polylactic acid resin composition according to embodiments of the present invention will hereinafter be described in detail. However, these embodiments are only exemplary, and the present invention is not limited thereto.

(A) Polylactic Acid (PLA) Resin

In general, a polylactic acid resin is a polyester-based resin prepared through ester reaction of lactic acid as a monomer. The lactic acid is prepared from decomposition of corn starch.

The polylactic acid resin can include L-lactic acid, D-lactic acid, or L,D-lactic acid. These polylactic acid resins can be used singularly or in combination. The polylactic acid resin may include an L-isomer in an amount of about 95 wt % or more to provide a balance between heat-resistance and formability. For example, the polylactic acid resin may include the L-isomer in an amount of about 95 to about 100 wt %, and the D-isomer in an amount of about 0 to about 5 wt %, taking into consideration hydrolysis resistance. In other exemplary embodiments, the polylactic acid resin can include the D-isomer in an amount of about 0.01 to about 2 wt %.

There is no particular limitation on the molecular weight or the molecular weight distribution of the polylactic acid as long as it can be molded. However, a polylactic acid resin with a weight average molecular weight of about 80,000 or more can provide a molded product with balanced mechanical strength and heat-resistance. In another embodiment, the polylactic acid resin may have a weight average molecular weight ranging from about 90,000 to about 500,000. The weight average molecular weight is generally obtained by multiplying a number average molecular weight measured using Gel Permeation Chromatography (GPC) by a polydispersity index.

The polylactic acid resin may include, for example, a polylactic acid polymer, a polylactic acid copolymer, or a combination thereof.

The polylactic acid polymer may be prepared by ring-opening a polymerizing lactic acid comprising the L-isomer, the D-isomer, or a combination thereof.

In exemplary embodiments of the invention, the polylactic acid resin composition of the invention may include the polylactic acid resin in an amount of about 25 to about 80 parts by weight. In another embodiment, the polylactic acid resin composition of the invention may include the polylactic acid resin in an amount of about 40 to about 60 parts by weight. When the polylactic acid resin is included within the above range, it may contribute to maintaining appropriate biomass and balancing formability and heat-resistance.

(B) Polycarbonate Resin

The polycarbonate resin may be prepared by reacting one or more diphenols of the following Formula 1 with phosgene, halogen formate, a carbonate, or a combination thereof.

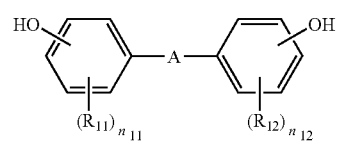

[Chemical Formula 1]

In the above Chemical Formula 1, A is a single bond, substituted or unsubstituted C1 to C5 alkylene, substituted or unsubstituted C1 to C5 alkylidene, substituted or unsubstituted C2 to C5 alkenylene, substituted or unsubstituted C3 to C6 cycloalkylene, substituted or unsubstituted C5 to C6 cycloalkylidene, substituted or unsubstituted C5 to C6 cycloalkenylene, CO, S, or $SO_2$, $R_{11}$ and $R_{12}$ are each independently substituted or unsubstituted C1 to C30 alkyl or substituted or unsubstituted C6 to C30 aryl, and $n_{11}$ and $n_{12}$ are each independently integers ranging from 0 to 4.

As used herein, when a specific definition is not otherwise provided, the term "substituted" refers to one substituted with at least a substituent selected from halogen, C1 to C30 alkyl, C1 to C30 haloalkyl, C6 to C30 aryl, C1 to C20 alkoxy, or a combination thereof.

The diphenols represented by the above Formula 1 may be used in combinations to constitute repeating units of the polycarbonate resin. Exemplary diphenols useful in the present invention include without limitation hydroquinone, resorcinol, 4,4'-dihydroxydiphenyl, 2,2-bis(4-hydroxyphenyl)-propane, 2,4-bis(4-hydroxyphenyl)-2-methylbutane, 1,1-bis(4-hydroxyphenyl)-cyclohexane, 2,2-bis(3-chloro-4-hydroxyphenyl)-propane, 2,2-bis(3,5-dichloro-4-hydroxyphenyl)-propane, and the like, and combinations thereof.

In one embodiment, the polycarbonate resin can have a weight average molecular weight ranging from about 10,000 to about 200,000, and in another embodiment, the polycarbonate resin can have a weight average molecular weight ranging from about 15,000 to about 80,000, but the present invention is not limited thereto.

The polycarbonate resin may include a mixture of copolymers prepared from two or more different diphenols. Exemplary polycarbonate resins may include linear polycarbonate resins, branched polycarbonate resins, polyester carbonate copolymers, and the like, and combinations thereof.

The linear polycarbonate resin may include a bisphenol-A-based polycarbonate resin. The branched polycarbonate resin may include one produced by reacting a multi-functional aromatic compound such as trimellitic anhydride, trimellitic acid, and the like, with diphenols and a carbonate. The multi-functional aromatic compound may be included in an amount of about 0.05 to about 2 mol % based on the total weight of the branched polycarbonate resin. The polyester carbonate copolymer resin may be prepared by reacting a difunctional carboxylic acid with diphenols and the carbonate. The carbonate may include a diaryl carbonate such as diphenyl carbonate and ethylene carbonate.

In exemplary embodiments of the invention, the polylactic acid resin composition of the invention may include the polycarbonate resin in an amount of about 20 to about 75 parts by weight, and in another embodiment, about 40 to about 60 parts by weight. When the polycarbonate resin is included within the above range, it can be advantageous in terms of balancing heat-resistance, impact strength, and environmentally-friendly effects.

(C) Chain Extender

The chain extender is a compound including an amine group that can react with the carboxyl group of a polylactic acid resin. In particular, it may include a siloxane-based compound substituted with an amine group or a polyolefin-based copolymer substituted with an amine group.

The chain extender may include a primary amine, a secondary amine, or a combination thereof as the amine group. The chain extender may include the amine group in an amount of about 0.1 to about 40 mol %. In another embodiment, the chain extender may include the amine group in an amount of about 1 to about 20 mol %.

In exemplary embodiments of the invention, the chain extender may include an amine group and a main chain such as methylsiloxane, polyethylene, or polypropylene.

For example, a chain extender having siloxane main chain may be represented by the following Chemical Formula 2:

[Chemical Formula 2]

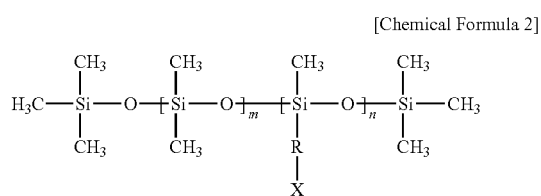

In the above Chemical Formula 2, m ranges from 300 to 2000, n ranges 5 or more, R is linear or branched C1 to C8 alkylene, and X is an amine group. The amine group may exist at the main chain or the terminal end of the C1 to C8 alkylene.

The chain extender may have a dynamic viscosity ranging from about 1 to about 100 Pa·s. In another embodiment, it may have a dynamic viscosity ranging from about 10 to about 50 Pa·s. When the chain extender has a dynamic viscosity within the above range, it can prevent bleeding-out from a resin, or unnecessary property deterioration.

In exemplary embodiments of the invention, the polylactic acid resin composition of the invention may include the chain extender in an amount of about 0.01 to about 5 parts by weight based on 100 parts by weight of (A)+(B). In another embodiment, the polylactic acid resin composition of the invention may include the chain extender in an amount of about 0.5 to about 3 parts by weight. When it is included within the above range, it can have appropriate viscosity for a melt extruder, and thereby can be easily mixed and molded.

(D) Other Additives

A polylactic acid resin composition with the aforementioned composition may further include an impact modifier to reinforce impact strength as well as increase viscosity, when the viscosity of the polylactic acid phase is increased.

The impact modifier has excellent affinity to the polylactic acid phase. Exemplary impact modifiers suitable for use in the present invention include without limitation core-shell type copolymers, linear ester-based or olefin-based copolymers, and the like, and combinations thereof.

The core-shell graft copolymer has a core-shell structure in which an unsaturated monomer is grafted into the core of a rubber to form a hard shell. Exemplary rubbers may include without limitation diene-based rubbers, acrylate-based rubbers, silicone-based rubbers, and the like, and combinations thereof. Exemplary unsaturated monomers include without limitation styrene, alkyl- or halogen-substituted styrene, methacrylonitrile, acrylonitrile, methacrylic acid alkyl esters, acrylic acid alkyl esters, anhydrides, alkyl- or phenyl-N-substituted maleimides, and the like, and combinations thereof.

The rubber may be obtained from polymerization of at least one rubber monomer selected from a C4 to C6 diene-based rubber monomer, an acrylate-based rubber monomer, a silicone-based rubber monomer, or a combination thereof.

Exemplary diene-based rubbers useful in the present invention include without limitation butadiene rubbers, ethylene/butadiene rubbers, styrene/butadiene rubbers, acrylonitrile/butadiene rubbers, isoprene rubbers, ethylene-propylene-diene (EPDM) tercopolymers, and the like, and combinations thereof.

The acrylate-based rubber includes acrylate monomers such as but not limited to methylacrylate, ethylacrylate, n-propylacrylate, n-butylacrylate, 2-ethylhexylacrylate, hexylmethacrylate, 2-ethylhexyl(meth)acrylate, and the like, and combinations thereof. Curing agents such as ethylene glycol di(meth)acrylate, propylene glycol di(meth)acrylate, 1,3-butylene glycol di(meth)acrylate or 1,4-butylene glycol di(meth)acrylate, allyl(meth)acrylate, triallylcyanurate, and the like may be used along with the acrylate monomers.

The silicone-based rubber can be obtained from a cyclosiloxane. Examples of cyclosiloxanes suitable for use in the present invention include without limitation hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like, and combinations thereof. Among these siloxanes, at least one can be selected to prepare a silicone-based rubber. Curing agents such as trimethoxymethylsilane, triethoxyphenylsilane, tetramethoxysilane, tetraethoxysilane, and the like, and combinations thereof may be used along with the cyclosiloxane.

The core-shell graft copolymer may include a rubber core material in an amount of about 50 to about 90 parts by weight. When the core-shell graft copolymer includes a rubber core material within this range, the impact modifier can have excellent compatibility with a resin and thus it can provide excellent impact reinforcement.

Exemplary unsaturated monomers capable of being grafted into the rubber may include without limitation styrene, alkyl or halogen substituted styrene, methacrylonitrile, acrylonitrile, methacrylic acid alkyl esters, acrylic acid alkyl esters, anhydrides, alkyl- or phenyl N-substituted maleimides, and the like, and combinations thereof.

Exemplary methacrylic acid alkyl esters and acrylic acid alkyl esters include $C_1$-$C_8$ alkyl esters of acrylic acid or methacrylic acid. For example, $C_1$-$C_8$ alkyl methacrylic acid esters or $C_1$-$C_8$ alkyl acrylic alkyl esters are esters obtained by reacting methacrylic acid or acrylic acid and C1 to C8 alkyl monohydroxyl alcohols. Exemplary methacrylic acid alkyl esters and acrylic acid alkyl esters include without limitation (meth)acrylic acid methyl ester, (meth)acrylic acid ethyl ester, (meth)acrylic acid propyl ester, and the like, and combinations thereof.

The anhydride may include an acid anhydride. In another embodiment, it may include a carboxylic anhydride such as maleic anhydride, itaconic anhydride, and the like, and combinations thereof.

The graftable unsaturated monomer may be included in a core-shell graft copolymer in an amount of less than about 40 parts by weight. In another embodiment, it may be included in an amount of about 5 to about 30 parts by weight. When the graftable unsaturated monomer is included within the above range, the impact modifier can have excellent compatibility with a resin, and as a result can provide excellent impact reinforcement.

A linear ester-based or olefin-based copolymer can be prepared by grafting an epoxy functional group or anhydride functional group onto a thermoplastic polyester-based or polyolefin-based main chain.

For example, the olefin-based copolymer can be prepared from at least one olefin-based monomer such as ethylene, propylene, isopropylene, butylene, isobutylene, and the like, and combinations thereof. The olefin-based copolymer can be prepared by using a Ziegler-Natta catalyst, which is a common olefin polymerization catalyst, or it can be prepared to have a more selective structure by using a metallocene-based catalyst. In order to improve its dispersibility, a functional group such as anhydrous maleic acid, glycidylmethacrylate, oxazoline, and the like can be grafted onto the olefin-based copolymer. Methods for grafting a reactive functional group onto the olefin-based copolymer are readily understood by those of ordinary skill in the art.

The impact modifier may be included in an amount of about 0.01 to about 30 parts by weight based on 100 parts by weight of (A)+(B). In another embodiment, it may be included in an amount of about 1 to about 10 parts by weight. When included within the above range, the impact modifier can contribute impact reinforcement effects and improve mechanical strength such as tensile strength, flexural strength, flexural modulus, and the like.

The polylactic acid resin composition of the invention may further include other additives such as but not limited to anti-hydrolysis agents, flame retardants, flame retarding assistants, lubricants, release agents, nucleating agents, antistatic agents, stabilizers, organic/inorganic reinforcing agents, coloring agents, antioxidants, weather resistance agents, ultraviolet (UV) blockers, fillers, plasticizers, adhesion aids, adhesives, and the like, and combinations thereof, for respective purposes.

Exemplary release agents may include without limitation fluorine-containing polymers, silicone oils, metal salts of stearic acid, metal salts of montanic acid, montanic acid ester waxes, polyethylene waxes, and the like, and combinations thereof. Exemplary coloring agents may include without limitation dyes, pigments, and the like and combinations thereof.

Exemplary ultraviolet (UV) blockers may include without limitation $TiO_2$, carbon black, and the like, and combinations thereof. Exemplary fillers may include without limitation silica, clay, calcium carbonate, calcium sulfate, glass beads, and the like, and combinations thereof. Exemplary nucleating agents may include without limitation talc, clay, and the like, and combinations thereof.

Exemplary antioxidants may include without limitation phenols, phosphites, thioethers, amines, and the like, and combinations thereof. Exemplary weather resistance agents may include without limitation benzophenones, amines, and the like, and combinations thereof.

The additives may be included in an amount such that they do not deteriorate the properties of a polylactic acid resin composition. In exemplary embodiments, the polylactic acid resin composition of the invention can include additive(s) in an amount of about 40 parts by weight or less based on about 100 parts by weight of the entire amount of the (A), (B), and (C) components. In another embodiment, the polylactic acid resin composition may include additive(s) in an amount of about 0.1 to about 20 parts by weight.

Polylactic acid resin in the polylactic acid resin composition forms a dispersed phase when blended under extrusion conditions with a thermoplastic resin, such as a polycarbonate resin, because the chain extender therein increases its viscosity to bring about its phase transition.

In addition, the viscosity ratio ($\eta_A/\eta_B$) between the viscosity ($\eta_A$) of the polylactic acid resin and viscosity ($\eta_B$) of the polycarbonate resin may be about 1 or more under the extrusion conditions (shear rate: about 40 to about 80 sec$^{-1}$ and extrusion temperature: about 230 to about 250° C.). In another embodiment, the viscosity ratio ($\eta_A/\eta_B$) between the viscosity ($\eta_A$) of the polylactic acid resin and viscosity ($\eta_B$) of the polycarbonate resin may satisfy the following Equation 1.

When the polylactic acid resin and the polycarbonate resin have a viscosity ratio ($\eta_A/\eta_B$) of about 1 or more, the polylactic acid resin may easily exhibit phase transition under extrusion conditions.

$$1 < \eta_A/\eta_B < 5 \quad \text{[Equation 1]}$$

In Equation 1, $\eta_A$ indicates the viscosity of a polylactic acid resin, and $\eta_B$ indicates the viscosity of a polycarbonate resin.

The polylactic acid resin composition can be prepared using conventional methods known in the art for preparing a resin composition. For example, the composition can be prepared into pellets by simultaneously mixing the components and other additives and melting and extruding the mixture in an extruder.

The polylactic acid resin composition can be used in a molded product requiring heat resistance and mechanical strength, for example vehicles, machine parts, electronic parts, office machines such as computers and the like, or miscellaneous goods. In particular, it can be used in housings for electronic and consumer products such as televisions, computers, printers, washing machines, cassette players, audio equipment, mobile phones, and the like.

According to still another embodiment, provided is a molded product manufactured by using the polylactic acid resin composition.

Hereinafter, the present invention is illustrated in more detail with reference to examples. However, the embodiments of the present invention are exemplary, and the present invention is not limited thereto.

EXAMPLES

The following (A) polylactic acid resin, (B) polycarbonate resin, (C) chain extender, and (D) impact modifier are used in the Examples of the invention and the Comparative Examples.

(A) Polylactic Acid Resin

Polylactic acid resin 4032D manufactured by American Nature Works LLC is used.

(B) Polycarbonate Resin

Bisphenol-A polycarbonate with a weight average molecular weight (Mw) of 25,000 is used.

(C) Chain Extender

A chain extender (manufactured by Momentive) with a viscosity of 11.2 Pa·s and including 1.62 mol % amine group and methyl siloxane as a main chain is used.

(D) Impact Modifier

METABLENE S-2001 (methyl methacrylate-butyl acrylate and dimethyl siloxane copolymer) of MRC is used as an impact modifier.

Example 1

A polylactic acid resin composition is prepared by mixing each component as shown in the following Table 1.

50 parts by weight of a polylactic acid (PLA) resin, 50 parts by weight of a polycarbonate resin, 1 part by weight of a chain extender, and 5 parts by weight of an impact modifier are put in a common screw extruder, and then extruded at a temperature ranging from 200 to 230° C. to prepare the polylactic acid resin composition into pellets.

Example 2

A polylactic acid resin composition is prepared according to the same method as Example 1, except for adding 2 parts by weight of a chain extender.

Example 3

A polylactic acid resin composition is prepared according to the same method as Example 1, except for adding 3 parts by weight of a chain extender.

Example 4

A polylactic acid resin composition is prepared according to the same method as Example 3, except for changing the amounts of polylactic acid resin and polycarbonate resin as shown in Table 1.

Example 5

A polylactic acid resin composition is prepared according to the same method as Example 3, except for changing the amounts of a polylactic acid resin and a polycarbonate resin as shown in Table 1.

Example 6

A polylactic acid resin composition is prepared according to the same method as Example 3, except for not using an impact modifier.

Comparative Example 1

A polylactic acid resin composition is prepared according to the same method as Example 1, except for not using a chain extender.

Comparative Example 2

A polylactic acid resin composition is prepared according to the same method as Example 1, except for using 10 parts by weight of a chain extender.

Comparative Example 3

A polylactic acid resin composition is prepared according to the same method as Example 5, except for not using a chain extender and an impact modifier.

TABLE 1

|  |  | Examples | | | | | | Comparative Examples | | |
| --- | --- | --- | --- | --- | --- | --- | --- | --- | --- | --- |
|  | unit | 1 | 2 | 3 | 4 | 5 | 6 | 1 | 2 | 3 |
| (A) polylactic acid resin | parts by weight | 50 | 50 | 50 | 40 | 60 | 50 | 50 | 50 | 60 |
| (B) polycarbonate resin | parts by weight | 50 | 50 | 50 | 60 | 40 | 50 | 50 | 50 | 40 |
| (C) chain extender | parts by weight | 1 | 2 | 3 | 3 | 3 | 3 | — | 10 | — |
| (D) impact modifier | parts by weight | 5 | 5 | 5 | 5 | 5 | — | 5 | 5 | — |

Property Evaluation

The pellets according to Examples 1 to 6 and Comparative Example 1 to 3 are dried at 80° C. for 4 hours, and then extruded by using a screw extruder with extruding capability of 6 oz to prepare an ASTM dumbbell specimen. The screw extruder is set to have a cylinder temperature of 230° C., a molding temperature of 80° C., and a molding cycle of 60 seconds.

The properties of the specimens are evaluated using the following methods. The results are shown in the following Table 2.

(1) Thermal distortion temperature (HDT): measured based on ASTM D648.

(2) Mechanical properties: measured based on ASTM D256.

(3) Hydrolysis resistance: A flexural specimen is allowed to stand inside a thermo-hygrostat at 80° C. and 95% relative humidity (RH) for 120 hours and the flexural strength is then measured. Hydrolysis resistance is calculated as a percentage (%) against flexural strength of the sample before it is allowed to stand.

TABLE 2

|  |  | Examples | | | | | | Comparative Examples | | |
| --- | --- | --- | --- | --- | --- | --- | --- | --- | --- | --- |
|  | unit | 1 | 2 | 3 | 4 | 5 | 6 | 1 | 2 | 3 |
| Thermal distortion temperature | ° C. | 69 | 73 | 77 | 85 | 75 | 73 | 57.3 | — | 50.4 |
| IZOD impact strength (¼") | kgf · cm/cm | 23.4 | 25.1 | 27.4 | 30.1 | 25.1 | 19.2 | 11.2 | — | 5.6 |
| Hydrolysis resistance (Flexural strength) | % | 48 | 54 | 58 | 59 | 58 | 55 | 0 | — | 0 |
| Extrusion* |  | ○ | ○ | ○ | ○ | ○ | ○ | ○ | X | ○ |
| $\eta_A/\eta_B$ |  | 1.7 | 2.2 | 3.5 | 3.5 | 3.5 | 3.2 | 0.8 | 5.6 | 0.7 |

Note)
○: extruded
X: not extruded

As shown in Table 2, the polylactic acid resin compositions of Examples 1 to 3 all exhibit improved heat resistance and hydrolysis resistance. In contrast, the polylactic acid resin composition of Comparative Example 1 which does not include chain extender has sharply-deteriorated impact strength and heat resistance, and also deteriorated hydrolysis resistance. In addition, as the amount of a chain extender is increased, heat resistance and hydrolysis resistance improve due to improved properties of polylactic acid itself.

The polylactic acid resin composition of Example 4 includes a smaller amount of polylactic acid as compared to the amount of polycarbonate, and has an improved dispersion phase and similar properties as compared to Example 3. The polylactic acid resin composition of Example 5 includes more polylactic acid resin than polycarbonate, and the chain extender induces a phase transition so that the composition has relatively high heat resistance and hydrolysis resistance. In addition, the polylactic acid resin composition of Example 6 which does not include impact modifier has better properties than the comparative examples.

In contrast, as shown in the polylactic acid resin composition of Comparative Example 2, when a chain extender is included in too large an amount, the resin may not be extruded. In addition, the polylactic acid resin compositions of Example 5 and Comparative Example 3 include a larger amount of polylactic acid than polycarbonate, but the composition of Comparative Example 3 without a chain extender had no phase transition, and therefore has low heat resistance and impact strength.

The morphology of pellets of Example 1 and Comparative Example 1 are observed using a transmission electron microscope (TEM). The results are provided in FIGS. 1 and 2, respectively.

Figure 2:
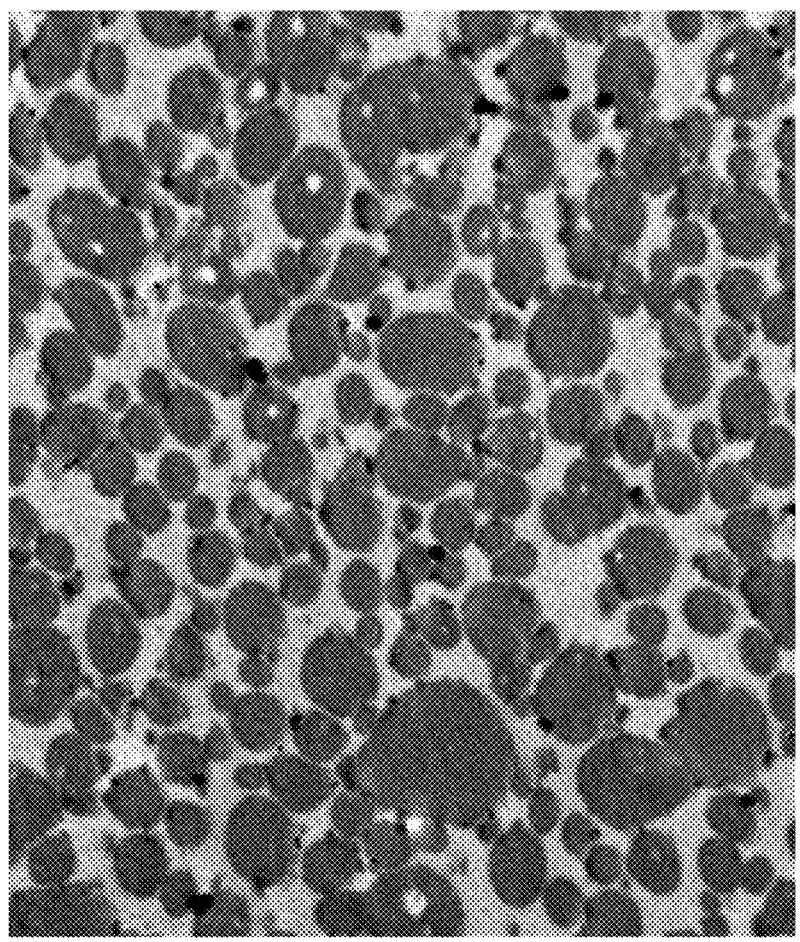
FIG. 2 shows the morphology photograph of a pellet according to Comparative Example 1 of the present invention, taken with a transmission electronic microscope.

FIG. 1 is a photograph showing the morphology of a specimen prepared using the pellets of Example 1 of the present invention, and FIG. 2 is a photograph showing the morphology of a specimen prepared using the pellets of Comparative Example 1.

Referring to FIGS. 1 and 2, the white part indicates a polylactic acid resin and the black part indicates a polycarbonate resin.

As shown in FIGS. 1 and 2, the composition of Example 1 includes polycarbonate resin as a continuous phase and polylactic acid resin as a dispersion phase, while the composition of Comparative Example 1 includes polylactic acid resin as a continuous phase.

When a chain extender is included in a polylactic acid resin composition, the polylactic acid resin had a dispersion phase due to a phase transition, and thereby has improved properties since the chain extender rectifies weak heat resistance, hydrolysis resistance, and impact strength of the polylactic acid.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A polylactic acid resin composition comprising:
   (A) about 25 to about 80 parts by weight of a polylactic acid resin;
   (B) about 20 to about 75 parts by weight of a polycarbonate resin; and
   (C) about 0.01 to about 5 parts by weight of a chain extender including an amine group based on about 100 parts by weight of (A)+(B), wherein the chain extender comprises a siloxane-based compound substituted with an amine group or a polyolefin-based copolymer substituted with an amine group.

2. The polylactic acid resin composition of claim 1, wherein the polylactic acid resin comprises more than about 95 wt % of an L-isomer.

3. The polylactic acid resin composition of claim 1, wherein the polycarbonate resin is prepared through reaction one or more diphenols represented by the following Formula 1, and phosgene, halogen formate, a carbonate, or a combination thereof:

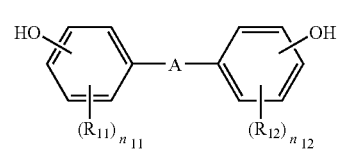

[Chemical Formula 1]

wherein, in the above Chemical Formula 1, A is a single bond, substituted or unsubstituted C1 to C5 alkylene, substituted or unsubstituted C1 to C5 alkylidene, substituted or unsubstituted C2 to C5 alkenylene, substituted or unsubstituted C3 to C6 cycloalkylene, substituted or unsubstituted C5 to C6 cycloalkylidene, substituted or unsubstituted C5 to C6cycloalkenylene, CO, S, or $SO_2$,
$R_{11}$ and $R_{12}$ are each independently substituted or unsubstituted C1 to C30 alkyl or substituted or unsubstituted C6 to C30 aryl, and
$n_{11}$ and $n_{12}$ are each independently integers ranging from 0 to 4.

4. The polylactic acid resin composition of claim 1, wherein the chain extender comprises a siloxane-based compound substituted with an amine group.

5. The polylactic acid resin composition of claim 1, wherein the chain extender comprises a polyolefin-based copolymer substituted with an amine group.

6. The polylactic acid resin composition of claim 1, comprising a viscosity ratio of the polycarbonate resin relative to the polylactic acid resin of about 1 or more at a shear rate of about 40 to about 80 $sec^{-1}$ and at an extrusion temperature ranging from about 230 to about 250° C.

7. The polylactic acid composition of claim 1, wherein the polylactic acid resin forms a dispersed phase.

8. The polylactic acid resin composition of claim 1, further comprising about 0.01 to about 30 parts by weight of an impact modifier.

9. The polylactic acid resin composition of claim 8, wherein the impact modifier comprises a core-shell copolymer, a thermoplastic polyester-based copolymer comprising an epoxy or anhydride functional group grafted onto a main chain thereof, a thermoplastic polyolefin-based copolymer comprising an epoxy or anhydride functional group grafted onto a main chain thereof, or a combination thereof.

10. The polylactic acid resin composition of claim 9, wherein the core-shell copolymer is prepared by grafting an unsaturated monomer comprising styrene, alkyl- or halogen-substituted styrene, (meth)acrylonitrile, acrylonitrile, methacrylic acid alkyl ester, acrylic acid alkyl ester, anhydride, alkyl-or phenyl-N-substituted maleimide, or a combination thereof onto a rubber polymer comprising a diene-based rubber, an acrylate-based rubber, a silicone-based rubber, or a combination thereof.

11. The polylactic acid resin composition of claim 1, wherein the resin composition further comprises an additive comprising an anti-hydrolysis agent, a flame retardant, a flame retarding assistant, a lubricant, a release agent, a nucleating agent, an antistatic agent, a stabilizer, an organic/inorganic reinforcing agent, a coloring agent, an antioxidant, a weather resistance agent, an ultraviolet (UV) blocker, a filler, a plasticizer, an adhesion aid, an adhesive, or a combination thereof.

12. A molded product manufactured using the polylactic acid resin composition of claim 1.

* * * * *

UNITED STATES PATENT AND TRADEMARK OFFICE
CERTIFICATE OF CORRECTION

PATENT NO. : 8,044,134 B2  
APPLICATION NO. : 12/478888  
DATED : October 25, 2011  
INVENTOR(S) : Young-Mi Chung and Chang-Do Jung Page 1 of 1

It is certified that error appears in the above-identified patent and that said Letters Patent is hereby corrected as shown below:

Title Page: should read as follows:

(30)       Foreign Application Priority Data

June 5, 2008          (KR) ................ 10-2008-0053114

Signed and Sealed this  
Tenth Day of January, 2012

David J. Kappos  
*Director of the United States Patent and Trademark Office*